R. C. RACER.
WHEEL.
APPLICATION FILED OCT. 13, 1919.

1,354,844.

Patented Oct. 5, 1920.
2 SHEETS—SHEET 1.

Witness
H. B. Wooden.

Inventor
R. C. Racer,
By C. A. Snow & Co.
Attorneys

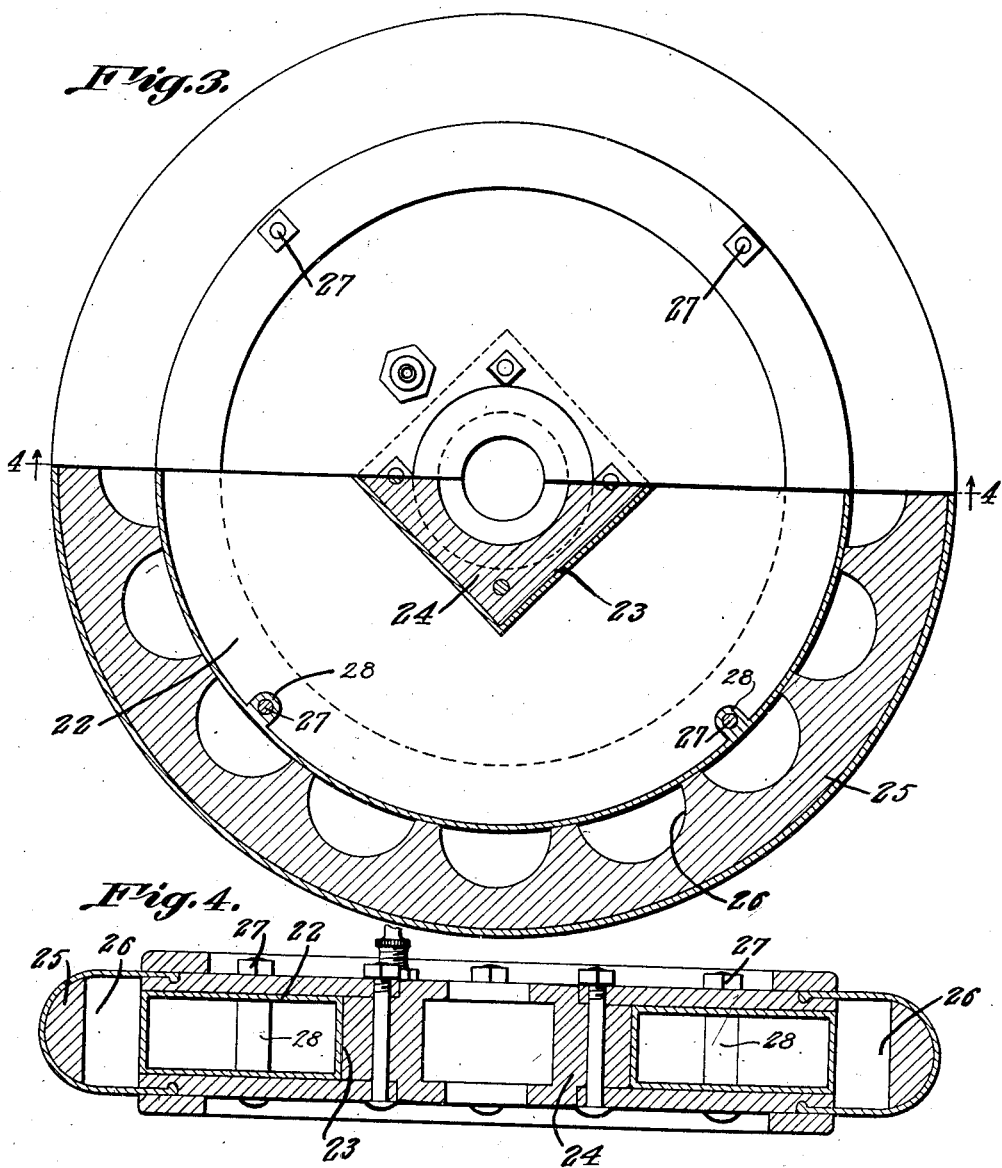

UNITED STATES PATENT OFFICE.

ROSCOE C. RACER, OF AKRON, OHIO.

WHEEL.

1,354,844.  Specification of Letters Patent.  Patented Oct. 5, 1920.

Application filed October 13, 1919. Serial No. 330,195.

*To all whom it may concern:*

Be it known that I, ROSCOE C. RACER, a citizen of the United States, residing at Akron, in the county of Summit and State of Ohio, have invented a new and useful Wheel, of which the following is a specification.

This invention relates to vehicle wheels, one of its objects being to provide a wheel having a pneumatic body held under suitable restraint and which is utilized for backing the rim portion of the wheel which is in the form of a cushion tire of suitable material.

A further object is to provide a wheel the parts of which can be assembled readily and which can be inflated and deflated without difficulty.

Another object is to provide a wheel of this character having much the appearance of an ordinary wheel provided with a pneumatic or with a cushion tire.

A still further object is to provide a wheel having a tread portion or casing which can easily be placed in or removed from position.

With the foregoing and other objects in view, which will appear as the description proceeds, the invention consists of certain novel details of construction and combination of parts which will be hereinafter more fully described and pointed out in the claims, it being understood that various changes may be made in the construction and arrangement of parts without departing from the spirit or sacrificing any of the advantages of the invention as set forth in the appended claims.

In the accompanying drawings the preferred form of the invention has been shown.

In said drawings—

Fig. 3 is a view similar to Fig. 1 and showing a modified structure.

Fig. 4 is a section on line 4—4, Fig. 3.

Figure 1:
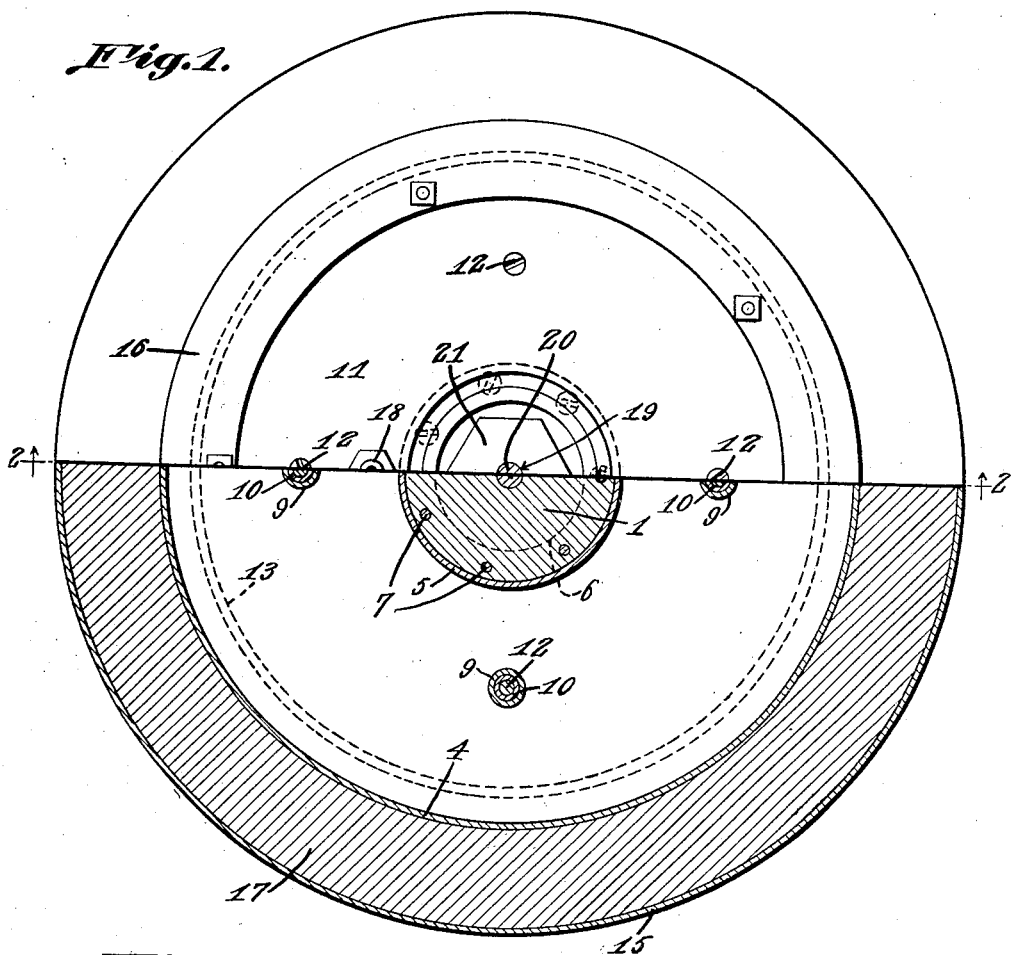
Figure 1 is a view partly in side elevation and partly in section of a wheel having the present improvements.
Figure 2:
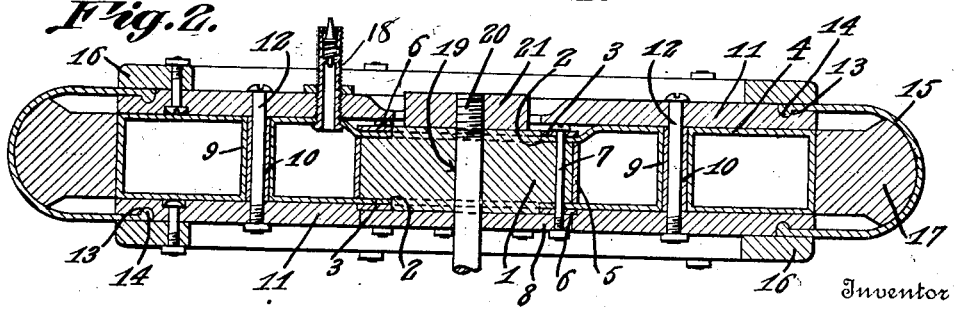
Fig. 2 is a section on line 2—2, Fig. 1.

Referring to the figures by characters of reference, 1 designates a hub having an annular groove at the margin of each side thereof, as shown at 2 and fitted in these grooves are flanges 3 extending from the sides of a circular air container of rubber, rubberized fabric or any other suitable air tight material, and which has been indicated at 4. These flanges 3 are extended inwardly from the inner circular wall of the container 4 and said inner wall, shown at 5, fits snugly against the periphery of the hub, as shown. Rings 6 of metal or any other suitable material are used for clamping the flanges 3 in the grooves and are held in place by bolts 7 extending through the hub. These bolts also serve to attach a disk 8 to one end of the hub. The container 4 is provided at regular intervals and at equal distances from its center, with transverse integral tubes 9 in each of which is housed a metal reinforcing tube 10 the ends of which are flush with the sides of the container.

Fitted against the ends of the hub 1 are circular side plates 11 the peripheries of which are substantially flush with the periphery of the container 4, and these plates are detachably secured to the container by transverse bolts 12 extending through the tubes 10 which tubes act as spacing sleeves between the side plates and prevent crushing of the container 4.

Formed in the outer face of each side plate 11 is a groove 13 close to and concentric with the periphery of the plate and these grooves are adapted to receive beads 14 extending inwardly from the edges of a tire casing 15 formed of rubberized fabric, leather, or any other desired material. The beads are held in the grooves 13 by rings 16 bolted to the plates 11 or detachably secured thereto in any other manner desired. A filler 17 of rubber or other resilient material is interposed between the casing 15 and the periphery of the container 4 so that, when the container is inflated, this filler will be pressed tightly against the casing 15. A valved tube 18 extends from the container and through one of the side plates 11 and by attaching an air pump thereto, the container 4 can be inflated so as to press the filler 17 firmly against the casing 15 so that the tread of the wheel will have all the resiliency of a pneumatic tire but will be more durable and efficient.

The hub 1 has the usual opening 19 therein for the reception of the spindle 20 engaged by the nut 21.

In Figs. 3 and 4 has been shown a structure in which the air container 22 is provided with a central angular space 23 receiving spacing means in the form of an angular hub 24. Thus the sleeves 9 and bolts 12 can be dispensed with and the container still be held against rotation relative to the side plates.

The filler 25 instead of being solid can be formed with transverse recesses in its inner face as shown at 26.

Transverse bolts 27 can connect the side plates close to the rim as shown and are extended through lugs 28 formed on the outer wall of the container 22.

What is claimed is:—

A wheel including a hub, a circular air container surrounding the hub, inwardly extending side flanges upon the container and lapping the ends of the hub, means for securing said flanges to the hub, circular side plates at opposite sides of the air container and lapping the hub, connections between the plates and extending transversely through the air container, sleeves upon the connections, tubular connections between the sides of the air container in which the sleeves are located, a casing secured to the side plates, and a resilient filler interposed between the casing and the peripheral portion of the air container, the peripheries of the container and of the side plates being normally flush.

In testimony that I claim the foregoing as my own, I have hereto affixed my signature in the presence of two witnesses.

ROSCOE C. RACER.

Witnesses:
 IVY E. SIMPSON,
 AGNES ROCKELLI.